United States Patent
Flasher

(10) Patent No.: US 7,025,359 B2
(45) Date of Patent: Apr. 11, 2006

(54) ROPE GASKET WITH TERMINATION

(75) Inventor: Gary L. Flasher, Spring City, PA (US)

(73) Assignee: Davlyn Manufacturing Company, Inc., Spring City, PA (US)

( * ) Notice: Subject to any disclaimer, the term of this patent is extended or adjusted under 35 U.S.C. 154(b) by 207 days.

(21) Appl. No.: 10/214,054

(22) Filed: Aug. 7, 2002

(65) Prior Publication Data

US 2004/0026874 A1   Feb. 12, 2004

(51) Int. Cl.
*F16J 15/02* (2006.01)

(52) U.S. Cl. .................... 277/631; 277/637; 277/653

(58) Field of Classification Search .............. 277/630, 277/631, 650, 651, 652, 653, 637
See application file for complete search history.

(56) References Cited

U.S. PATENT DOCUMENTS

| | | | |
|---|---|---|---|
| 505,084 A * | 9/1893 | Barnes | 277/631 |
| 505,703 A * | 9/1893 | Dodge | 277/631 |
| 623,982 A * | 5/1899 | Chesterton | 277/631 |
| 747,448 A * | 12/1903 | Lomasney | 277/631 |
| 749,969 A * | 1/1904 | Munson | 277/631 |
| 866,696 A * | 9/1907 | Taylor | 277/631 |
| 3,578,764 A | 5/1971 | Nunnally et al. | |
| 3,781,021 A * | 12/1973 | Thompson et al. | 277/631 |
| 3,812,316 A | 5/1974 | Milburn | |
| 4,223,660 A | 9/1980 | Lang | |
| 4,371,180 A * | 2/1983 | Case et al. | 277/652 |
| 4,538,381 A | 9/1985 | Vogel | |
| 4,822,060 A | 4/1989 | Moyer et al. | |
| 4,979,280 A | 12/1990 | Weil | |
| 4,986,033 A | 1/1991 | Weil | |
| 5,066,028 A | 11/1991 | Weil | |
| 5,107,623 A | 4/1992 | Weil | |
| 5,205,075 A | 4/1993 | Moyer | |
| 5,289,658 A | 3/1994 | Lusen et al. | |
| 5,341,601 A | 8/1994 | Moyer | |
| 5,395,126 A | 3/1995 | Tresslar | |
| 5,806,149 A | 9/1998 | Schultz et al. | |
| 5,918,885 A | 7/1999 | Radke, II | |
| 6,533,289 B1 * | 3/2003 | Bono et al. | 277/630 |

FOREIGN PATENT DOCUMENTS

DE    103 50 197 A1 *   8/2005

\* cited by examiner

*Primary Examiner*—Alison K. Pickard
(74) *Attorney, Agent, or Firm*—Akin Gump Strauss Hauer & Feld, LLP

(57) ABSTRACT

The present invention is a gasket comprising a length of rope formed at least substantially by a plurality of interwoven fibrous glass yarns and having at least two ends, and a soft wire mesh termination sleeve placed around and attached to the rope member at the joint that conforms to the shape of the gasket joint.

20 Claims, 1 Drawing Sheet

ROPE GASKET WITH TERMINATION

BACKGROUND OF THE INVENTION

Interwoven fibrous rope gaskets are often used for sealing and cushioning around windows used in devices that operate at high temperatures such as the glass window of an oven. Typical rope gaskets are problematic at the location where the two ends of the rope meet to form a joint and make the gasket a loop. Some gaskets do not have any termination device to help secure the joint formed by bringing the ends of the rope gasket together. This often results in fraying of the rope at the joint that lessens aesthetical appeal of the gasket and its effectiveness as a sealing device. The absence of a termination device around the joint also results in a weak joint that can break apart and make the gasket discontinuous at the joint. Some known devices include a termination part that helps secure the joint, but these known termination parts have encountered several problems. The materials used to conceal the joint have tended to cause a lump at the joint and have burned due to the high operating temperatures. Lumping and burning at the joint results in a less effective seal. Additionally, typically the termination parts have not conformed to the shape of the joint. In these known termination parts that cannot be manipulated to tightly conform to the shape of the joint there is still a possibility of fraying. Termination parts that do not conform to the shape of the gasket also tend to cause an irregularity of shape at the joint, making it more difficult to create an effective installation and seal with the gasket. There is thus a need for a gasket with a termination sleeve in which the sleeve can be easily altered to tightly conform to the shape of the joint in order to effectively keep the joint secure and the rope from fraying. The termination sleeve would also have to resist burning or lumping to ensure a continually tight seal.

BRIEF SUMMARY OF THE INVENTION

Briefly, the invention is a gasket comprising: a length of rope with two free ends formed at least substantially by a plurality of interwoven fibrous glass yarns wherein the ends of the rope are brought together to form a joint, and a termination sleeve positioned around the joint formed by two free ends of the length of rope, the sleeve being a preformed tube sufficiently soft to essentially conform to the shape of the rope at the joint.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
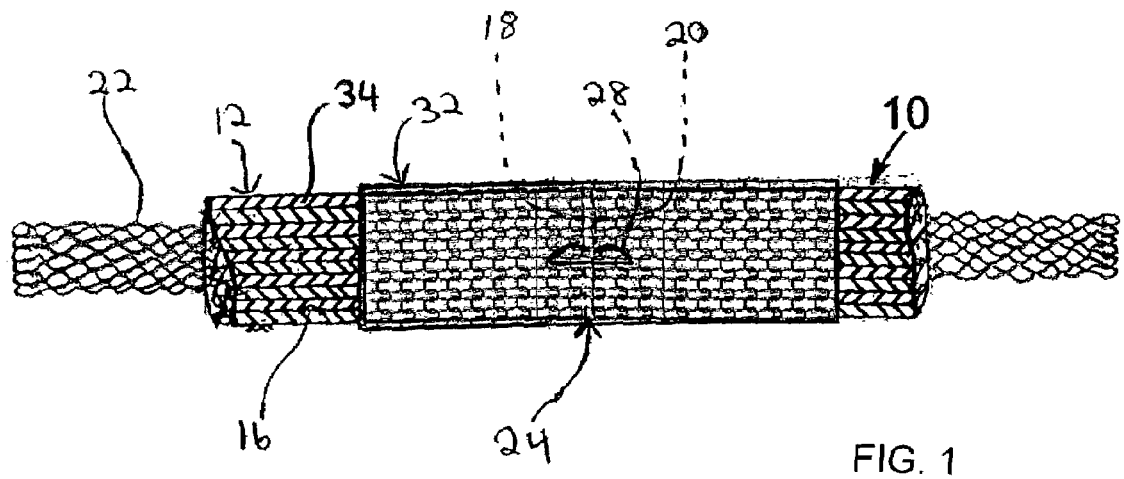
FIG. 1 is a diagrammatic, partially broken view of a preferred embodiment of a tubular gasket-type device of the invention.
Figure 2:
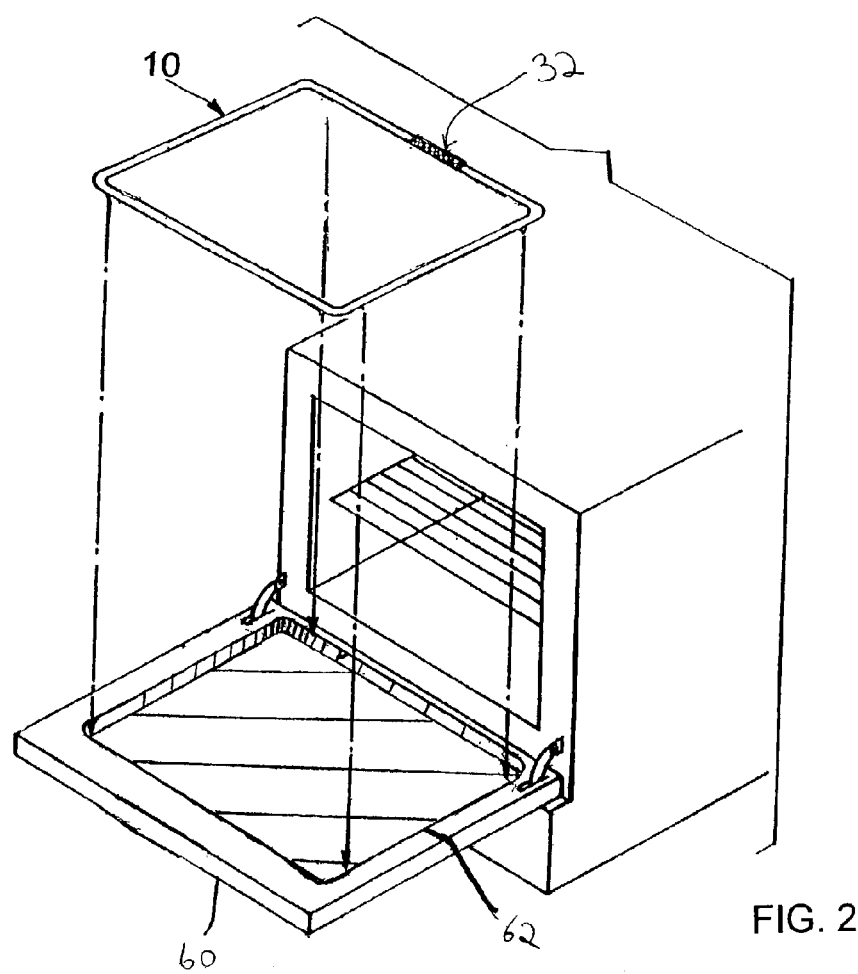
FIG. 2 depicts schematically the present invention being mounted around an oven door window.

Referring to the drawings in detail, like numerals are employed for the indication of like elements throughout. There is shown in FIGS. 1–2, indicated generally at 10, a preferred embodiment of a continuous or closed loop rope gasket of the present invention with termination sleeve, suitable for providing cushioning and a seal around windows used in high temperature devices such as the glass window used in an oven. The gasket 10 is primarily intended to seal in heat, smoke, and vapors. Referring specifically to FIG. 1 the gasket 10 primarily comprises a length of rope 12 with at least two free ends 18, 20, a joint 24 formed by bringing together the two free ends 18, 20 of rope 12, a termination sleeve 32 surrounding the joint 24, and an attachment device 28 to both attach the free ends 18, 20 to each other to form the joint 24 and the termination sleeve 32 to the rope 12 overlapping the joint 24 where the free ends 18, 20 meet, to form the closed or continuous loop of gasket 10. The termination sleeve 32 is a preformed tube, preferably seamless and preferably made of a thin knit wire mesh so as to be sufficiently soft to at least essentially conform to the shape of the rope 12 at the joint 24. The rope 12 is preferably at least substantially formed by a plurality of interwoven fibrous yarns 34 forming a flexible and indeterminate length of rope 12, which is cut to size for use. Preferably, the rope 12 is woven in a conventional manner from glass fiber yarns 34. Glass fiber is an inert material having good resistance to damage induced from heat, moisture and other environmental conditions which might be encountered in using the product. Braiding is preferred as a relatively easy way to weave a flexible yet dense, tightly packed rope from glass fiber yarns 34. Alternatively, the glass fiber yarns can be knitted together into the rope.

Of course, the rope 12 could also be reinforced with another material(s), for example, metal wire. Such material(s) could be provided within individual yarns or as yarn(s) within the rope as a minor or significant component, but still less than the content of the fibrous material in the rope. Preferably, if reinforcement is desired, a knit length of wire is passed into the center of the yarns being fed into a braider so that the wire forms a core 22 of the rope 12 surrounded by the braided yarns. The core 22 is shown in FIG. 1 as extending from one end of the device for clarity, but in use the glass fiber yarns 34 surrounds and extends along the core 22. A flexible knitted wire core 22 for a rope gasket might be made of suggestedly three to seven mils, untreated to fully hard, depending upon the desired level of resiliency, 304 stainless steel wire ten mils or less in diameter, in a continuous jersey knit having approximately eight wales/inch and eight to twelve courses/inch to form a continuous knit, cylindrically-shaped, hollow tube approximately one quarter of an inch in diameter. The specification for a wire knitting machine to knit a hollow wire core like the core 22 may be seven-eights inch cylinder, eight needles, eighteen gauge, circular jersey knitting machine. In any case, wire reinforcement provides greater resiliency and strength to the gasket 10 and a significant potential range of resiliency but still allows the gasket 10 to be flexible. Since the fit of the gasket is important to its functioning effectively, a gasket that better maintains its shape over time and a large number of cycles of use increases the effective lifespan of the gasket 10. The greater resiliency is also helpful in conforming the gasket 10 to the shape needed for installation around a window. A better fit around a window further improves the functioning of the gasket.

Shown in FIG. 1, is a preformed, preferably seamless termination sleeve 32 surrounding and attached to the joint 24 formed by the rope ends 18, 20 of the length of rope 12. The sleeve 32 is designed to strengthen the joint 24 and to prevent the rope ends 18, 20 from fraying. Preferably sleeve 32 is formed from knit wire mesh. The knit wire tube expands in diameter as the tube is longitudinally compressed making rope end insertion easier. Preferably, the mesh sleeve 32 is made from unhardened wire so that it is soft and conforming as opposed to springy. A mesh sleeve that is soft can bend and conform to the shape of the gasket at the joint more easily than a springy sleeve that would tend to maintain its shape rather than conform to the shape of the rope joint 24. This is important for several reasons. The use of such a soft knit wire mesh tube for the termination sleeve 32 allows for the termination sleeve 32 to be easily pressed into the existing shape of the rope. A conforming termination sleeve does the best job of preventing fraying at the joint. Since the soft wire mesh sleeve 32 can be easily shaped, it can be snugly fit around the rope ends 18, 20 to minimize the change in thickness of the gasket while controlling possible fraying yarns. Additionally, a mesh sleeve 32 that conforms to the shape of the rope joint 24 better avoids lumping at the joint 24 and is less likely to get in the way or be snagged by any other parts during its installation or use. The ability of the wire mesh sleeve 32 to be pressed into different shapes also allows for versatility in the shape around which it is installed. The wire mesh termination sleeve does not have to be used around a joint 24 that is perfectly straight. Rather, it can be bent if it must be used around a corner or other non-linear shape. Other qualities of the wire mesh termination sleeve 32 are that it can add strength to the joint 24 and can withstand highest temperatures that the glass fiber yarn can sustain without damage.

The wire mesh sleeve 32 is preferably made of stainless steel, although it may be made of another suitable metallic material. Unhardened stainless steel is readily available as a thin wire that allows for a soft and conforming wire mesh sleeve 32 that can be exposed to extreme temperatures without burning. Thin wire adds little bulk to the joint 24, helping to maintain a consistent rope circumference throughout the length of the rope 12. While a thickness of three to five mils is preferably constitutes thin wire, wire thicknesses outside that range can be used depending upon the use of the wire and application for the gasket 10. Additionally, the sleeve has a length of over an inch, preferably at least one and one-half inch. This length allows the sleeve 32 to fully surround the joint and typical attachment means. However, any mesh sleeve length that is sufficient for encompassing the joint may be used.

The wire mesh sleeve 32 is preferably attached to the length of rope 12, and the rope ends 18, 20 are attached to each other, by an attachment device 28. As shown in FIG. 1, the attachment device is preferably a single staple 28. The staple 28 is preferably applied to the outside of the mesh wire sleeve 32 and passed through the entirety of the glass fiber rope 12 and the other side of the mesh wire sleeve 32. Since only a single staple 30 is needed for both the attachment of the wire mesh sleeve 32 and the free ends 18, 20 to each other, connecting the joint 24 and the wire mesh sleeve 32 by such means is relatively simple. Although a single staple 28 is preferable, multiple staples or some other means of attachment such as metal wire stitches may also be used. Also the staple 28 can be passed through the ends 18, 20 of the rope 12 and the sleeve 32 thereafter simply slid over the resulting joint 24.

As shown in FIG. 2, one application of the rope gasket 10 is around the window 62 of an oven door 60. A rope gasket 10 that has a wire mesh termination sleeve to prevent fraying is particularly useful in an oven door 60 because it can cushion the window in place, seal against the escape of heat, smoke, and vapors, and ensure that no fraying is seen through the window 62. An oven door window 62, however, is only one example of the many applications of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A continuous loop gasket comprising:
    a length of rope having at least two ends, the rope being formed at least substantially by a plurality of interwoven fibrous yarns, wherein the ends of the rope are brought together to form a joint, and
    a termination sleeve positioned and pressed around the joint formed by two free ends of the length of rope, the sleeve being a preformed tube sufficiently soft to essentially conform to the shape of the rope at the joint and to hold the shape after being pressed.

2. The gasket of claim 1 further comprising an attachment device joining together two ends of the rope at the joint.

3. The gasket of claim 2 wherein the attachment device is a staple.

4. The gasket of claim 1 further comprising a flexible wire core within the length of rope.

5. The gasket of claim 1 wherein the fibrous yarns of the length of rope are braided together.

6. The gasket of claim 5 wherein the termination sleeve is seamless.

7. The gasket of claim 1 wherein the termination sleeve is made of stainless steel.

8. The gasket of claim 1 wherein the termination sleeve is seamless.

9. The gasket of claim 1 wherein the termination sleeve is knitted wire mesh.

10. The gasket of claim 1 wherein the fibrous yarns are at least essentially glass fiber by content.

11. The gasket of claim 1 in combination with an oven door, the gasket surrounding an opening in the door.

12. The gasket of claim 1 wherein the termination sleeve is seamless and made of stainless steel.

13. The gasket of claim 1 wherein the termination sleeve is knitted wire mesh and seamless.

14. The gasket of claim 1 wherein the termination sleeve is seamless and further comprising a flexible wire core within the length of rope.

15. The gasket of claim 1 wherein the termination sleeve is knitted wire mesh and further comprising a flexible wire core within the length of rope.

16. The gasket of claim 1 wherein the fibrous yarns of the length of rope are braided together and the termination sleeve is knitted wire mesh.

17. The gasket of claim 1 wherein the fibrous yarns of the length of rope are at least essentially glass fiber by content and are braided together.

18. The gasket of claim 17 wherein the termination sleeve is knitted wire mesh.

19. A continuous loop gasket comprising:

a length of rope having at least two ends, the rope being formed at least substantially by a plurality of interwoven fibrous yarns, wherein the ends of the rope are brought together to form a joint, a termination sleeve positioned around the joint formed by two free ends of the length of rope, the sleeve being a preformed tube sufficiently soft to essentially conform to the shape of the rope at the joint and to hold the shape, and an attachment device joining together two ends of the rope at the joint, wherein the attachment device further joins at the termination sleeve to the rope overlapping the joint.

20. A continuous loop gasket comprising:

a length of rope having at least two ends, the rope being formed at least substantially by braiding together at least a plurality of interwoven fibrous glass yarns, wherein the ends of the rope are brought together to form a joint, a knitted wire mesh termination sleeve positioned and pressed around the joint formed by two free ends of the length of rope, the sleeve being a preformed tube sufficiently soft to essentially conform to the shape of the rope at the joint and to hold the shape after being pressed, and an attachment device joining together two ends of the rope at the joint.

* * * * *